(12) United States Patent
Little (10) Patent No.: US 9,098,303 B2
(45) Date of Patent: Aug. 4, 2015

(54) PORTABLE COMPUTING DEVICE PROVIDING OPERATING SYSTEM FOR HOST DEVICES

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/018,203

(22) Filed: Sep. 4, 2013

(65) Prior Publication Data

US 2015/0067196 A1 Mar. 5, 2015

(51) Int. Cl.
G06F 3/00 (2006.01)
G06F 13/38 (2006.01)
G06F 15/173 (2006.01)
G06F 9/44 (2006.01)
G06F 11/30 (2006.01)

(52) U.S. Cl.
CPC ............ *G06F 9/441* (2013.01); *G06F 11/3051* (2013.01)

(58) Field of Classification Search
None
See application file for complete search history.

(56) References Cited

U.S. PATENT DOCUMENTS

| | | | | |
|---|---|---|---|---|
| 5,388,211 A | * | 2/1995 | Hornbuckle | 717/178 |
| 6,421,777 B1 | * | 7/2002 | Pierre-Louis et al. | 713/2 |
| 6,535,976 B1 | * | 3/2003 | Hoggarth et al. | 713/2 |
| 6,718,463 B1 | * | 4/2004 | Malik | 713/2 |
| 7,222,206 B2 | | 5/2007 | Kee et al. | |
| 7,296,098 B2 | | 11/2007 | Shih | |
| 7,493,487 B2 | | 2/2009 | Phillips et al. | |
| 8,370,605 B2 | * | 2/2013 | Nejah et al. | 712/30 |
| 2002/0087625 A1 | * | 7/2002 | Toll et al. | 709/203 |
| 2005/0038945 A1 | | 2/2005 | Himmel et al. | |
| 2007/0198656 A1 | * | 8/2007 | Mazzaferri et al. | 709/218 |
| 2008/0046528 A1 | * | 2/2008 | Gilhuly et al. | 709/206 |
| 2009/0007104 A1 | | 1/2009 | Zimmer et al. | |
| 2009/0024757 A1 | * | 1/2009 | Proctor | 709/232 |
| 2009/0228868 A1 | * | 9/2009 | Drukman et al. | 717/121 |
| 2010/0082821 A1 | * | 4/2010 | Rosenblatt et al. | 709/228 |
| 2010/0113092 A1 | | 5/2010 | Mitchell | |
| 2010/0235545 A1 | * | 9/2010 | Gouraud | 710/5 |
| 2010/0312919 A1 | * | 12/2010 | Lee et al. | 710/14 |
| 2011/0113219 A1 | * | 5/2011 | Golshan et al. | 712/30 |
| 2012/0011285 A1 | * | 1/2012 | Matton et al. | 710/8 |
| 2012/0297177 A1 | | 11/2012 | Ghosh et al. | |
| 2013/0283193 A1 | * | 10/2013 | Griffin | 715/761 |
| 2014/0101426 A1 | * | 4/2014 | Senthurpandi | 713/2 |
| 2014/0189138 A1 | * | 7/2014 | Summers | 709/230 |

OTHER PUBLICATIONS

Mark B. Friedman, "Plug-and-Play Devices on Windows Tablets," Performance by Design Blogspot, Nov. 21, 2012, [retrieved Mar. 12, 2015], 12 pages, Internet: <http://performancebydesign.blogspot.in/2012/11/plug-and-play-devices-on-windows-tablets.html>.

* cited by examiner

*Primary Examiner* — Michael Sun
(74) *Attorney, Agent, or Firm* — Lowenstein Sandler LLP (57) ABSTRACT

A portable computing device detects a connection to a host computing device and receives data from the host computing device identifying at least one of a device type of the host computing device or properties of the host computing device. The portable computing device selects an operating system from a plurality of available operating systems installed on the portable computing device in view of the received data. The portable computing device loads the selected operating system.

20 Claims, 5 Drawing Sheets

PORTABLE COMPUTING DEVICE PROVIDING OPERATING SYSTEM FOR HOST DEVICES

TECHNICAL FIELD

Embodiments of the present invention relate to computing devices, and more specifically to a portable computing device that can provide an operating system for host computing devices.

BACKGROUND

It is common for a user to have many computing devices that the user uses on a regular basis. For example, a user may have a mobile phone, a tablet computer, a notebook or laptop computer, and a desktop computer. Each of these computers includes its own processors, memory, storage devices, operating systems, and so on. It can be inconvenient for the user to move data between these different devices.

BRIEF DESCRIPTION OF THE DRAWINGS

The present embodiments are illustrated by way of example, and not of limitation, in the figures of the accompanying drawings.

DETAILED DESCRIPTION

Embodiments described herein provide a portable computing device that provides a processor, storage and an operating system to one or more host computing devices. Additionally, some embodiments describe host computing devices lacking a native operating system that rely on a portable computing device to provide the operating system. The portable computing device additionally stores applications and user data in addition to the operating system. The portable computing device provides access to the operating system, user data and applicants to a host computing device that the portable computing device is plugged into. Accordingly, when the portable computing device is plugged into a host mobile phone, the portable computing device provides an operating system, applications and user data to the host mobile phone. When the portable computing device is plugged into a host laptop computer, the portable computing device provides an operating system, applications and user data to the desktop computer. Thus, the same user data is available to all of a user's computing devices. Additionally, embodiments of the present invention may reduce a total amount of memory, processors and storage devices that are manufactured since the portable computing device provides such for each of the host computing devices that it plugs into. This may reduce a total amount of waste caused by discarded computing devices.

In one embodiment, a portable computing device (also referred to as a computing card) is plugged into a host device (also referred to as a shell device). The portable computing device and the host computing device each detect the connection. The host computing device sends, and the portable computing device receives, data identifying at least one of a device type of the host computing device or properties of the host computing device. The portable computing device then selects and loads an appropriate operating system from multiple available operating systems installed on the portable computing device in view of the received data. The portable computing device transmits data to the host computing device, which the host computing device stores in local memory and/or a local storage device. When the portable computing device is disconnected from the host computing device, the host computing device detects the disconnection and wipes the local memory and/or local storage device of all data from the portable computing device.

Figure 1:
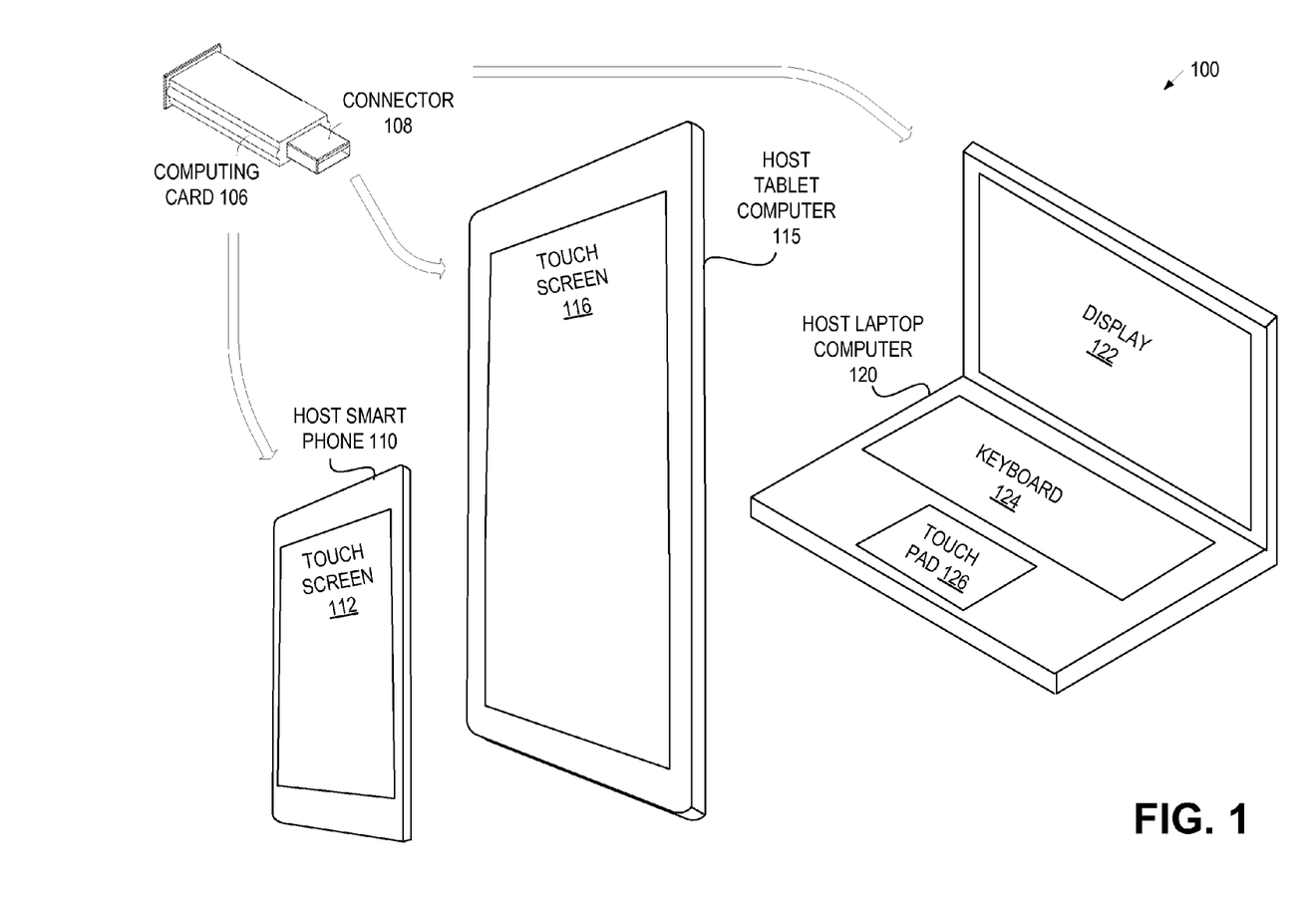
FIG. 1 illustrates a computing card and host devices that the computing card can be plugged into, in accordance with embodiments of the present invention.

FIG. 1 illustrates a system 100 including a computing card 106 and host devices that the computing card can be plugged into, in accordance with embodiments of the present invention. The computing card 106 is a small portable computing device that can be inserted into, plugged into or otherwise connected to multiple different types of host computing devices.

The computing card 106 includes one or more processors, a memory, an onboard storage device, and a port or connector 108. The connector 108 may be a universal serial bus (USB) connector, a serial port, a parallel port, a Firewire connector, or other type of connector. The computing card 106 stores one or more operating systems in its storage device, and further stores numerous applications as well as user data.

The computing card 106 may have a form factor similar to a memory stick or thumb drive as shown. Alternatively, the computing card 106 may have a form factor similar to a secure digital (SD) card, mini SD card, or other memory card. The computing card may also have a form factor similar to a credit card or battery pack. Other form factors are also possible.

Examples of host computing devices that the computing card 106 may be plugged into include a host smart phone 110, a host tablet computer 115 and a host laptop computer 120. Each of these host computing devices may have a different form factor and one or more components for interfacing with a user. For example, the host smart phone 110 may include a touch screen 112, a dial pad, a miniature keyboard, speakers, microphones, a camera, a display, and so forth. The host tablet computer 115 may include a touch screen 116, microphone and/or speakers. The host laptop computer 120 may include a display 122, a keyboard 124, a touchpad 126, a camera, and so forth. Each of the host devices may additionally include other hardware suitable for a purpose of the host computing device. For example, the host laptop computer 120 may include a digital video disc (DVD) player, a network adapter, a graphics card, and so forth. The host smart phone 110 may similarly include a graphics card and network adapter, and may additionally include a wireless modem for connecting to a wireless network of a wireless carrier (e.g., to a 3G wireless network, to an LTE wireless network, etc.).

Each of the host computing devices 110, 115, 120 may lack an operating system. The host computing devices 110, 115, 120 may additionally lack a processor, memory and/or storage device. These host computing devices may rely on the computing card 106 to provide the operating system as well as the processors, memory and/or storage devices. In other implementations, the host computing devices 110, 115, 120 may include processors, memory and/or storage devices that supplement similar components of the computing card 106.

When the computing card 106 is plugged into a particular host computing device, the computing card determines an appropriate operating system to use for the host computing device. For example, when the computing card 106 is plugged into the host smart phone 110 or host tablet computer 115, the computing card 106 may determine that the Andriod® operating system (OS), iOS® operating system or Windows® Mobile OS should be run, and launch an instance of the determined OS. When the computing card 106 is plugged into the host laptop computer 120, the computing card 106 may determine that a Linux® OS, a Windows OS or an OS X™ operating system should be run, and launch the determined OS. The OS running on the computing card 106 may then control the host computing device that it is plugged into.

Figure 2:
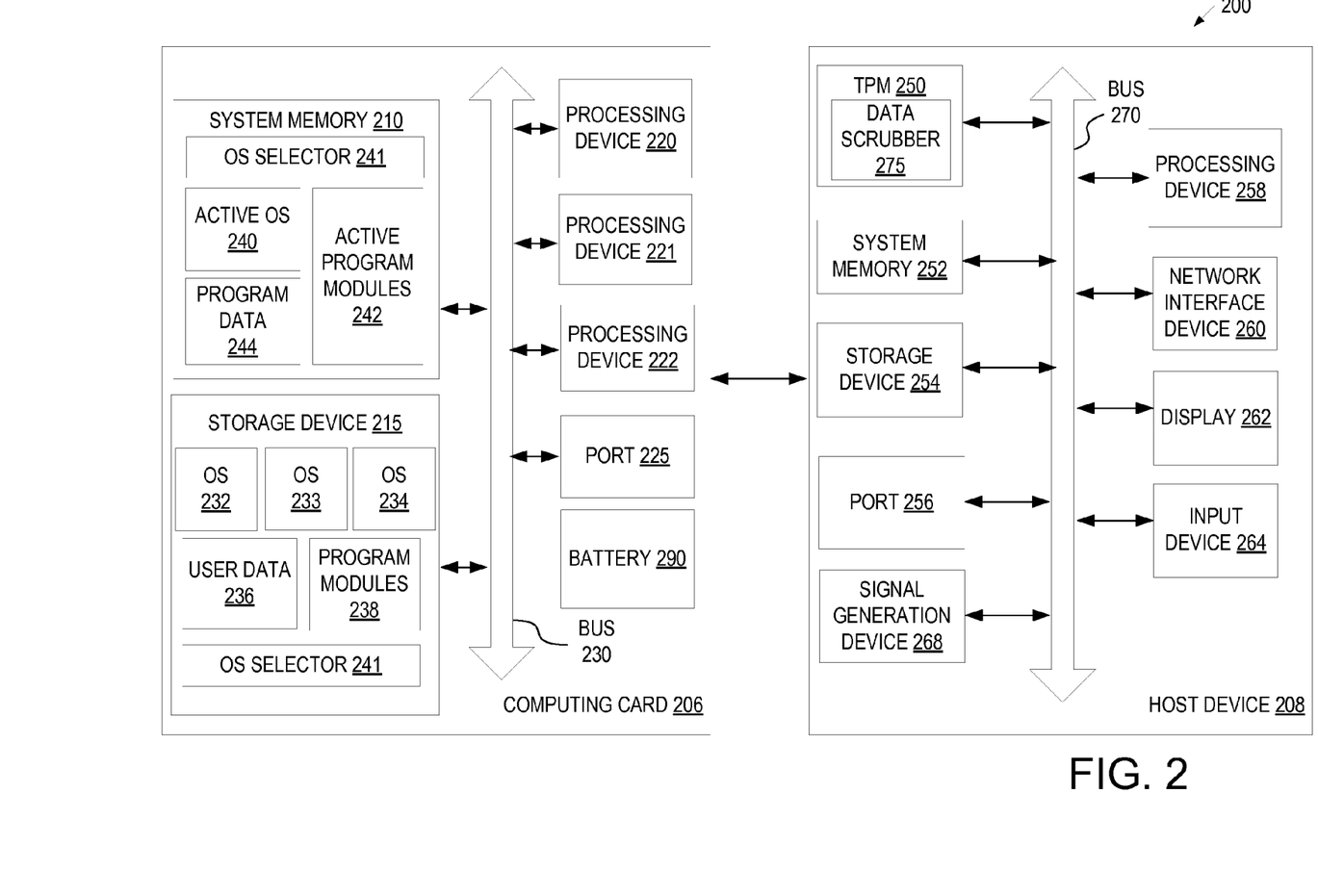
FIG. 2 is a block diagram illustrating a computing card coupled to a host computing device according to one embodiment.

FIG. 2 is a block diagram of a system 200 that includes a computing card 206 coupled to a host device 208. The computing card 206 may be a portable computing device with a small form factor that lacks a user interface or that has a minimal user interface. For example, the computing card 206 may not have any buttons, a display, speakers, or user inputs. Alternatively, the computing card 206 may have one or more light emitting diodes (LEDs) or other lights to indicate power and/or battery life, and/or may include a small display. The small display may indicate battery life, a current operating system that is running, available storage capacity, a device type that the computing card is connected to and/or other information.

The host device 208 may be a host desktop computer, a host smart phone, a host tablet computer, a host electronic book reader, a host laptop computer, a host portable media player, a host video camera, a host digital camera, or other type of host computer. The host device 208 lacks its own operating system, or includes a limited operating system such as a version of an embedded Linux operating system, embedded Windows CE operating system or embedded Minix 3 operating system. In either case, the host device 208 relies on the computing card 206 to provide a full service operating system such as Windows, Linux, OS X, Android, iOS, and so on.

Computing card 206 may connect to host device 208 by connecting port 225 to port 256 of host device 208. The ports may be universal serial bus (USB) ports with male and female connectors, respectively. Alternatively, the ports may be Firewire ports, serial ports, parallel ports, or other types of ports. Preferably the ports are high speed ports that enable the communication of large amounts of data between processing devices 220-222 and components of the host device 208.

The computing card 206 includes one or more processing devices 220, 221, 222, a system memory 210 (also referred to as a main memory), a data storage device 215 (also referred to as secondary storage) and the port 225 connected via a bus 230. The computing card 206 may additionally include other components standard to computing devices that are not illustrated so as not to obfuscate embodiments of the invention.

Processing devices 220-222 represent one or more general-purpose processors, such as a microprocessor, central processing unit, or the like. More particularly, one or more of the processing devices 220-222 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing devices 220-222 may also be one or more special-purpose processing devices such as an application specific integrated circuit (ASIC), a field programmable gate array (FPGA), a digital signal processor (DSP), network processor, or the like.

The processing devices 220-222 execute instructions of one or more operating systems 232, 233, 234 and program modules 238 (e.g., processes) that run on the operating systems. In one embodiment, each of the processing devices 220-222 has the same processor architecture. For example, all of the processing devices 220-222 may have an x86 processor architecture. Alternatively, different processing devices may have different processor architectures. For example, processing device 220 may have an x86 processor architecture and processing device 221 may have an ARM processor architecture.

Storage device 215 may include a non-transitory computer readable storage medium in the form of a drive unit, which may include fixed or removable computer-readable storage medium. Examples of computer readable storage media include, but are not limited to, any type of disk including floppy disks, optical disks, disk drives, solid state drives, CD-ROMs and magnetic-optical disks, read-only memories (ROMs), random access memories (RAMs), erasable programmable read only memories (EPROMs), electrically erasable programmable read only memories (EEPROMs), magnetic or optical cards, flash memory, or any type of media suitable for storing electronic instructions.

Storage device 215 stores multiple operating systems 232, 233, 234, user data 236 and program modules 238. The OSes 232-234 manage hardware components of the computing card 206 and of the host device 208 and provide common services for programs, applications and processes. The OSes 232-234 may be any type of operating systems. Additionally, different operating systems that are configured to run on different types of processor architectures may be included in the secondary memory 215. For example, OS 232 may be configured to operate on a processing device having an x86 processor architecture (e.g., may be a Windows, Linux or OS X operating system), and OS 233 may be configured to operate on a processing device having an ARM processor architecture (e.g., may be an Android, iOS or Windows Phone operating system).

Program modules 238 may be any processes, applications or programs that are configured to run on any of the OSes 232-234. Each of the stored OSes 232-234 may be stored in a separate partition or folder on the storage device 215. Program modules 238 that are programmed to operate on a specific OS may be stored in the partition or folder associated with that specific OS. Alternatively, each OS and its associated program modules may be stored within a virtual disk image. User data 236 may be stored in an area of storage device 215 that is accessible to each of the OSes 212-234. Accordingly, if a user creates a document from a first OS, that user may later access the same document from a second OS.

Instructions to be executed by the processing devices 220-222 and data to be used by the processing devices 220-222 are loaded into system memory 210. System memory 210 may be random access memory (RAM), dynamic RAM (DRAM), flash memory, static RAM (SRAM), or other types of memory. System memory 210 may be directly or indirectly connected to the processing devices 220-222 via a memory bus, which may include an address bus and a data bus. The address bus may be used to transport memory addresses that indicate locations of data, and the data bus may be used to transport payload data to be stored in memory or retrieved from memory.

Storage device 215 may additionally include instructions for an operating system selector 241, which may be loaded into system memory 210 and executed to select an operating system 232, 233, 234 and/or processing device 220, 221, 222 to use for a particular host device 208. When computing card 206 connects with host device 208, computing card 206 receives data from the host device 208 indicating a device type (e.g., a mobile phone, a table computer, etc.) and/or properties of the host device. The device type may be a unique identifier that represents a particular make and/or model of a host device.

Examples of properties that host device 208 may report include a display size and display type, a graphics card, attached peripheral devices, available system memory, whether host device has an onboard processing device and/or a type of onboard processing device, whether the host device has an onboard storage device 254 and/or the storage capacity of such an onboard storage device, properties of a network interface device, and so on. The reported data may also include a notification of a particular operating system or operating systems that the host device 208 is optimized to work with.

OS selector 241 may use the received data to determine an operating system that is appropriate for managing the host device 208. For example, if the host device 208 contains a particular type of processor, graphics card and/or other components, OS selector 241 may determine which OS 232-234 includes drivers that are capable of controlling such a graphics card, processor and/or other components. In one embodiment, OS selector 241 maintains an OS data structure such as a table or list that includes unique identifiers for multiple different types of host devices and OSes to use for such host devices. When an identifier is received from a host device, OS selector 241 may compare the identifier to the OS data structure to determine which OS to load. The OS data structure may additionally or alternatively include a listing of supported and/or unsupported host device components for each of multiple different operating systems. Each entry may indicate a particular operating system and have fields for supported and unsupported components. If a unique identifier is not received, OS selector 241 may determine an OS to select by matching the received data to an entry in the OS data structure.

As mentioned, different OSes may run on different processor architectures. Once OS selector 241 selects an OS, OS selector 241 may select a processing device 220 to run the selected OS. For example, if processing device 220 is an ARM processor and OS selector 241 selects an Android OS, then OS selector 241 may select processing device 220 for use.

In some implementations computing card 206 may include a single processing device or multiple processing devices that all have the same processor architecture. However, OS selector 241 may select an OS that does not run on that processor architecture. In such an implementation, computing card 206 may include a hypervisor (not shown) and one or more virtual machines (not shown) that may emulate the processor architecture that is compatible with the selected OS. Additionally, a hypervisor and virtual machines may be used in some implementations even if the selected OS is compatible with an available processing device.

The hypervisor may manage local system resources, including access to system memory 210, storage device 215, processing devices 220-222, and so on. The hypervisor may additionally manage remote system resources of the host device 208, including access to the network interface device 260, display 262, input device 264, and so on. Alternatively, the hypervisor may rely on a host OS to manage the system resources. In such an embodiment, the host OS may be a first OS type that operates on the processor architecture, and a guest OS in the virtual machine may be a second OS type that is compatible with the host device 208.

The hypervisor, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The hypervisor presents to other software (i.e., "guest" software) the abstraction of one or more virtual machines (VMs), which may provide the same or different abstractions to various guest software (e.g., guest operating system, guest applications, etc.).

The computing card 206 may host any number of virtual machines (VM). A virtual machine is a combination of guest software that uses an underlying emulation of a host machine (e.g., as provided by the hypervisor). Each VM may include one or multiple virtual components such as virtual processors, virtual memory, virtual devices (e.g., virtual storage), virtual NICs, and so forth. Each of these virtual components may map to a hardware component of the computing card 206 or a hardware component of the host device 208. Virtual machines can be, for example, hardware emulation, full virtualization, para-virtualization, and operating system-level virtualization virtual machines. The guest software that runs in a VM may include a guest operating system, guest applications, guest device drivers, etc. The virtual machines may have the same or different guest operating systems, such as Windows®, Linux®, Solaris®, etc.

Once an OS and processing device are selected, OS selector 241 initiates a boot-up process of the selected OS on the selected processing device. This additionally includes writing data to the system memory 210 for the selected OS, which becomes an active OS 240. Additional program modules may additionally be loaded into system memory 210 to become active program modules 242, and program data 244 may be loaded into system memory 210.

Host device 208 includes a network interface device 260, a display 262, an input device 264, a cursor control device 266, a signal generation device 268 and a port 256 connected via a bus 270. Host device may additionally include a main memory 252, secondary memory 254, processing device 258 and/or other computer hardware. Moreover, host device may be connected to external peripheral devices such as printers, microphones, speakers, and so forth.

The host device 208 may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. The host device 208 also may include output devices such as a display or projector (e.g., a liquid crystal display (LCD)) connected to the host device through a graphics port and graphics chipset. Host device 208 may also include an input device 264 such as an alphanumeric input device (e.g., a keyboard), a cursor control device (e.g., a mouse, touchpad or touch screen), and so on.

The host device 208 may include a network interface device 260. The network interface device may connect host device 208 to other machines in a LAN, an intranet, an extranet, the Internet, or a wireless network. In one embodiment, the network interface device is a wired network interface device and includes an Ethernet port. In one embodiment, the network interface device is a wireless network interface device and includes a Wi-Fi modem. In one embodiment, the network interface device is a wireless modem that enables the host device 208 to communicate with a wireless network (e.g., such as provided by a wireless carrier). The wireless modem allows the host device 208 to handle both voice and non-voice communications (such as communications for text messages, multimedia messages, media downloads, web browsing, etc.). The wireless modem may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), Wi-Fi, long term evolution (LTE), etc.

Host device 208 may additionally include a system memory 252, storage device 254 and/or one or more processing devices 258, which may supplement the processing devices 220-222, system memory 210 and/or storage device 215 of the computing card. During operation, the active OS 240 may cause data to be written to the system memory 252 and/or storage device 254. Additionally, the active OS 240 may utilize processing device 258, which causes data to be cached in the processing device 258.

Host device 208 may additionally include a trusted platform module (TPM) 250. The TPM 250 may be a secure, tamper resistant circuit configured to perform security functions. The TPM 250 may monitor system events to determine when a computing card has been connected or disconnected from the host device 208. When the TPM 250 determines that the computing card 206 has been disconnected, a data scrubber 275 of the TPM 250 may erase all data associated with the computing card 206 from the main memory 252, secondary memory 254 and/or processing device 258. Additionally, the data scrubber 275 may cause the processing device 258 to shut down, which may clear all volatile caches of the processing device 258. In an alternative embodiment, a hardware component other than TPM 250 may include the data scrubber 275. Alternatively, the data scrubber 275 may be implemented in software.

In another embodiment, host device 208 stores some data from the computing card 206 after the computing card is removed. In such an embodiment, TPM 250 may encrypt the stored data using a key that is possessed by the computing card 206. Computing card 206 may deliver the key to host device 208 when they are connected or during the connection. Alternatively, the computing card and host device may establish the key using a key sharing protocol. On detecting that the computing card 206 has been disconnected, host device 208 may encrypt all data associated with the computing card 206, and may then delete the key. The computing card 206 may store the key, and may provide the key to host device 208 when they are next connected. In such an embodiment host device 208 may securely store data associated with different computing cards 206 to speed up a connection and startup process.

After computing card 206 is disconnected from host device 208, or upon detecting that a disconnection is imminent, active OS 240 may store data to storage device 215 and/or shut down the computing card 206. In some implementations, computing card 206 may include a battery 290. If a battery 290 is included, then the active OS 240 may suspend the computing card 206. This may include the active OS 240 powering down processing devices 220-222, storage device 215 and/or some system memory 210. Active OS 240 may determine which processes of the active OS 240 and/or of the active program modules 242 to maintain in memory, and may shut down remaining processes and/or write data for remaining processes to storage device 215. While the computing card is in a suspended mode, the system memory 210 may receive periodic refreshes to maintain the data that is stored therein. This may reduce an amount of power that is consumed by the computing card 206. If the battery life falls below a threshold (e.g., 5% battery life or 10% battery life), then the computing card may be shut down.

Figure 3:
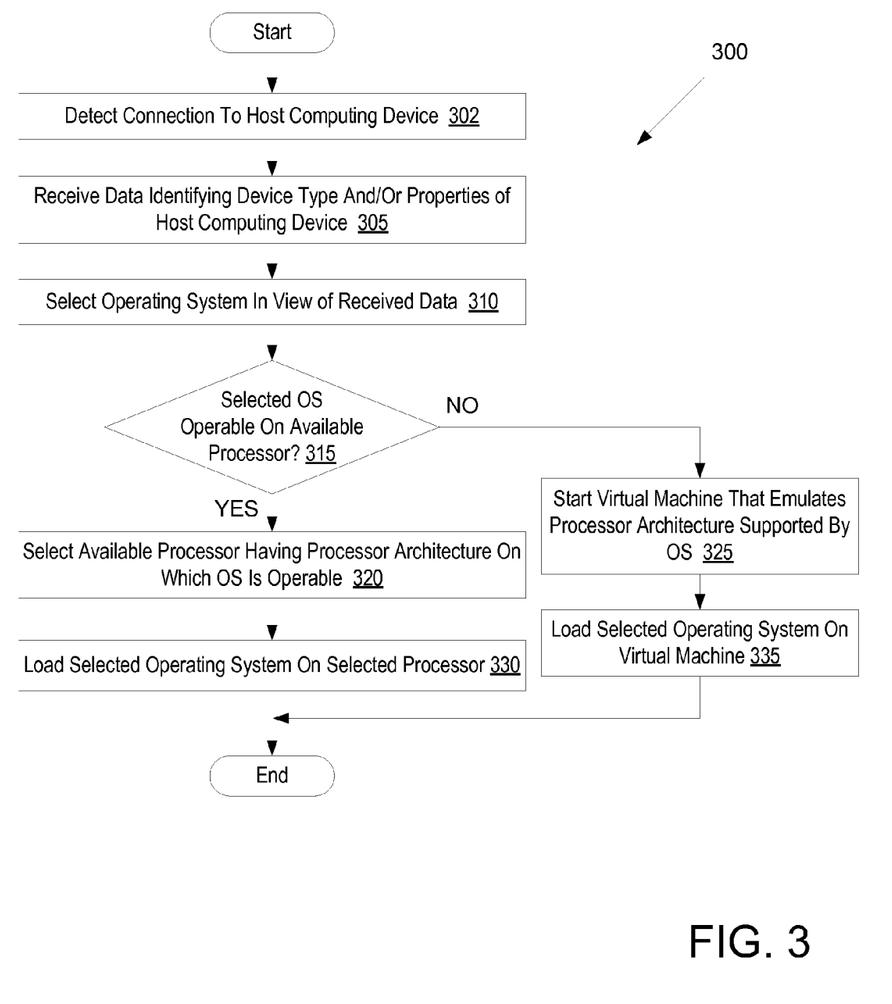
FIG. 3 is a flow diagram of one embodiment for a method of providing processing services for a host computing device by a portable computing device.
Figure 4:
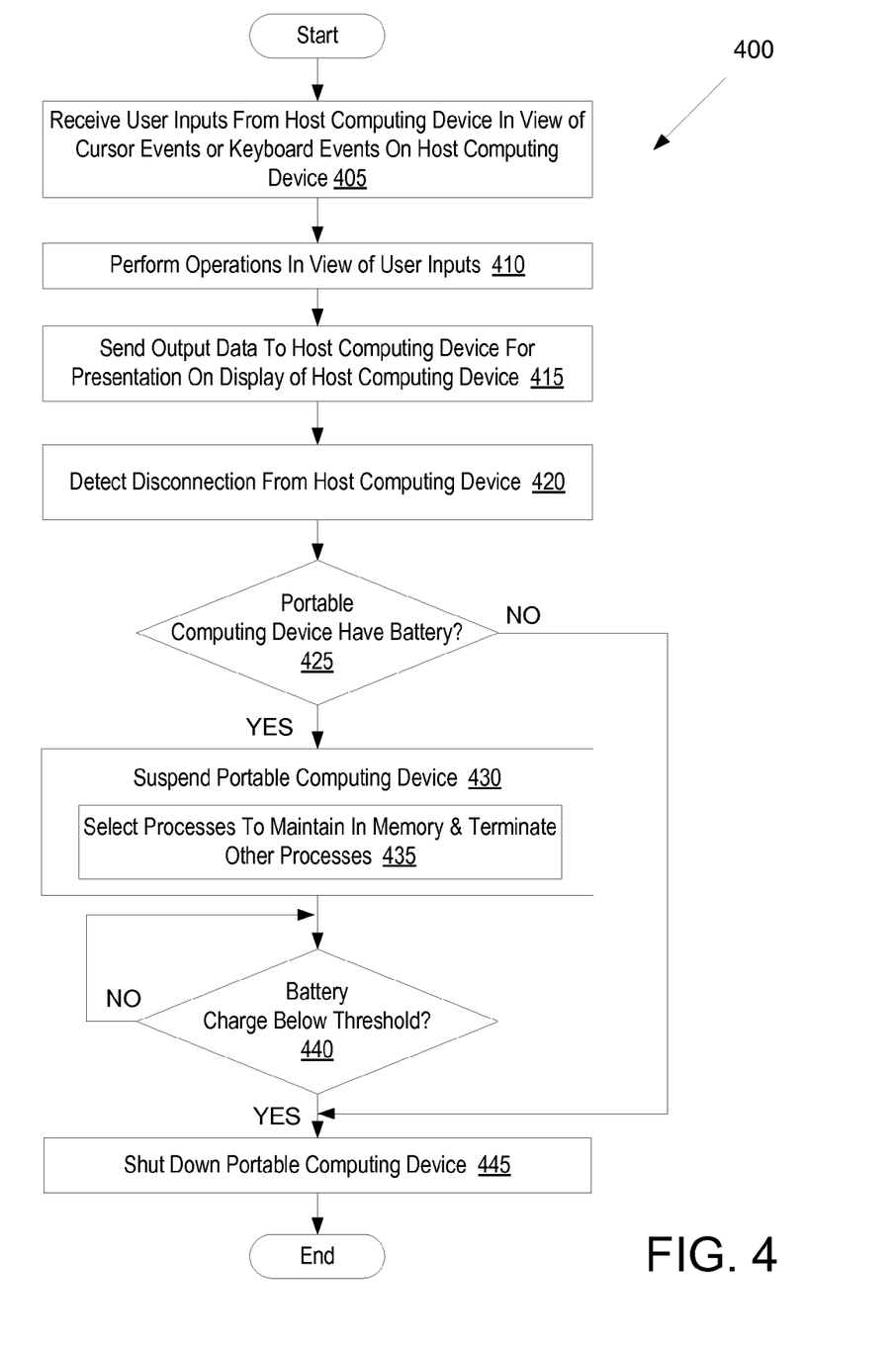
FIG. 4 is a flow diagram of another embodiment for a method of providing processing services for a host computing device by a portable computing device.
Figure 5:
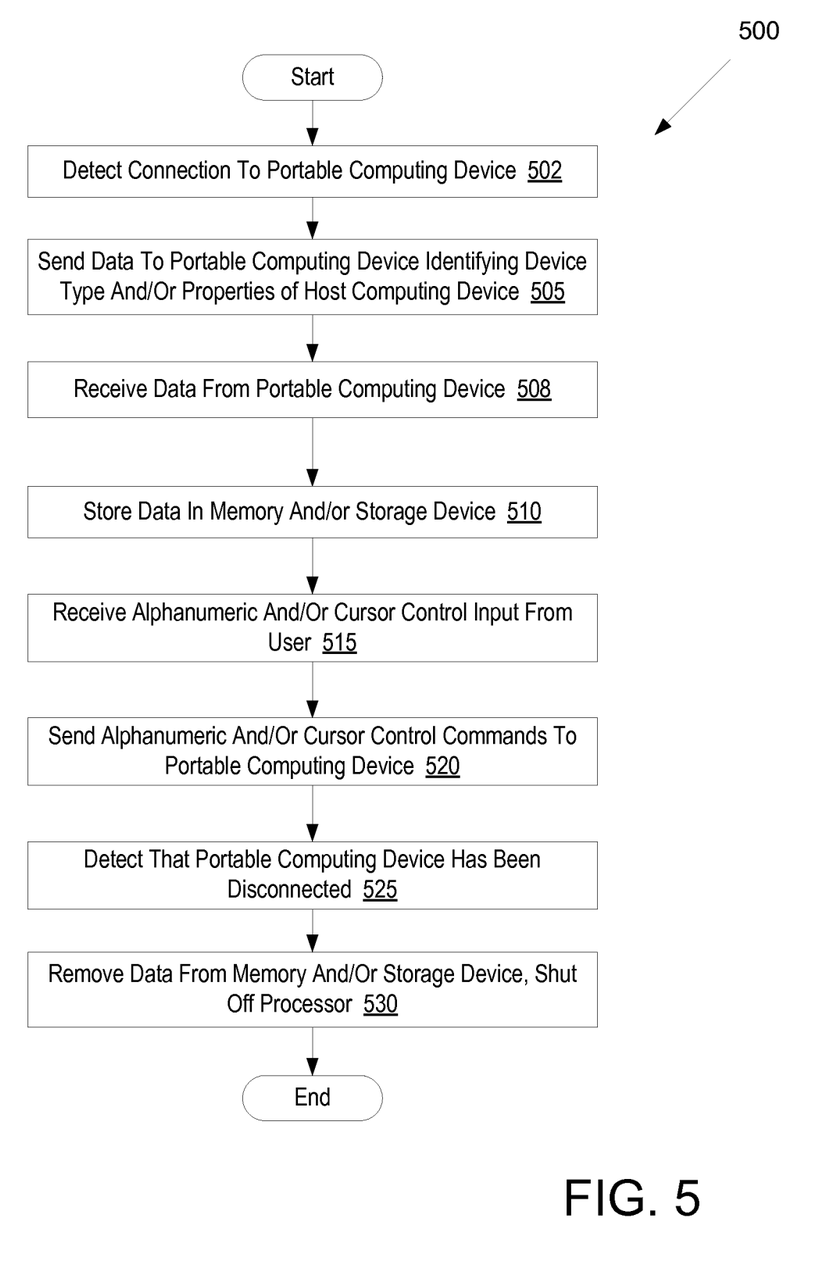
FIG. 5 is a flow diagram of one embodiment for a method of providing a user interface for a portable computing device by a host computing device.

FIGS. 3-5 are flow diagrams showing various methods associated with integrating a computing card with a host computing device. Some methods may be performed by a computing card using hardware (e.g., circuitry, dedicated logic, programmable logic, microcode, etc.), firmware (e.g., code stored in persistent memory) and/or software (e.g., by an operating system and/or program modules running on a processing device). Some methods may be performed by a host computing device using hardware (e.g., circuitry, dedicated logic, programmable logic, microcode, etc.), firmware (e.g., code stored in persistent memory) and/or software (e.g., by an operating system and/or program modules running on a processing device).

FIG. 3 is a flow diagram of one embodiment for a method 300 of providing processing services for a host computing device by a portable computing device (e.g., by computing card 206 of FIG. 2). At block 302 of method 300, processing logic of the portable computing device detects a connection to a host computing device. At block 305, processing logic receives data identifying a device type and/or properties of the host computing device. At block 310, the processing logic selects an operating system in view of the received data.

At block 315, the processing logic determines whether the selected OS is operable on an available processor. If there is not available processor having a processor architecture on which the selected OS will run, then the method proceeds to block 325. If the selected OS will run on an available processor, the method continues to block 320.

At block 320, the processing logic selects the available processor having a processor architecture on which the selected OS is operable. At block 330, processing logic loads the selected operating system on the selected processor.

At block 325, the processing logic starts a virtual machine that emulates a processor architecture supported by the selected OS. At block 335, the processing logic then loads the selected OS on the virtual machine.

FIG. 4 is a flow diagram of another embodiment of a method 400 for providing processing services for a host computing device by a portable computing device. At block 405 of method 400 a portable computing device receives user inputs from a host computing device in view of cursor events or keyboard events on the host computing device. At block 410, an operating system running on the portable computing device performs operations in view of the user inputs. At block 415, the operating system of the portable computing device sends output data to the host computing device for presentation on a display of the host computing device. The operating system may additionally send output data that includes instructions for storing information on the host computing device, for outputting audio data to a sound card, for printing data, for transmitting data over a network connection, and so forth.

At block 420, the portable computing device detects a disconnection from the host device. At block 425, processing logic of the portable computing device determines whether the portable computing device includes a battery. If a battery is detected, then the method continues to block 430. Otherwise the method proceeds to block 445.

At block 430, the processing logic suspends the portable computing device. This may include selecting processes to maintain in memory and other processes to terminate (block 435). At block 440, processing logic determines whether a battery has a charge that is below a charge threshold. If the charge is not below the charge threshold, the method returns to block 440. If the battery reaches a charge that is below the charge threshold, the method continues to block 445. At block 445, the portable computing device is shut down.

If the portable computing device is plugged back into a host computing device while it is in a suspended state, then processing logic determines whether the suspended OS is appropriate for the new host device. This includes going through most of method 300. If the OS that is selected at block 315 of method 300 corresponds to the suspended OS, then the suspended OS may be transitioned into a full powered on state. This transition may take less time than starting up an OS from storage. If the selected OS does not correspond to the suspended OS, then the suspended OS may be shut down, and the newly selected OS may be started.

FIG. 5 is a flow diagram of one embodiment for a method 500 of providing a user interface for a portable computing device by a host computing device. At block 502 of method 500, processing logic of a host computing device detects a connection to a portable computing device. At block 505, processing logic sends data to the portable computing device. The data may identify a device type of the host computing device and/or properties of the host computing device.

At block 508, processing logic receives data from the portable computing device. At block 510, processing logic stores the data in main memory and/or a storage device of the host computing device. Processing logic may additionally receive instructions to be executed by a processing device of the host computing device.

At block 515, the host computing device receives alphanumeric and/or cursor control inputs from a user. At block 520, processing logic sends alphanumeric and/or cursor control commands to the portable computing device.

At block 525, processing logic detects that the portable computing device has been disconnected. At block 530, processing logic removes data associated with the portable computing device from memory and/or the local storage device of the host computing device. Processing logic may additionally take other precautions such as writing random 0s and/or 1s in the storage device to eliminate a possibility of retrieving deleted information. Processing logic may also shut down a processor of the host computing device to clear its volatile cache. These steps may ensure that a subsequent portable computing device that plugs into the host computing device will not be able to access any data associated with the first portable computing device.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "sending," "storing," "detecting," "determining," "selecting," or the like, refer to the actions and processes of a computing device that manipulates and transforms data represented as physical (e.g., electronic) quantities within the computing system's registers and memories into other data similarly represented as physical quantities within the computing system memories or registers or other such information storage, transmission or display devices.

The term "computer-readable storage medium" should be taken to include a single medium or multiple media (e.g., a centralized or distributed database and/or associated caches and servers) that store the one or more sets of instructions. The term "computer-readable medium" shall also be taken to include any medium other than a carrier wave that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, and magnetic media.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    detecting, by a computing device, a connection to a host computing device;
    receiving, by the computing device, data from the host computing device identifying at least one of a device type of the host computing device or properties of the host computing device;
    selecting, by the computing device, an operating system from a plurality of available operating systems installed on the computing device in view of the received data; and
    loading the selected operating system on the computing device to boot up the selected operating system.

2. The method of claim 1, further comprising:
    receiving user inputs from the host computing device in view of cursor events or keyboard events on the host computing device;
    performing operations based on the user inputs; and
    sending output data to the host computing device.

3. The method of claim 1, wherein the computing device comprises a first processor having a first processor architecture and a second processor having a second processor architecture, wherein the computing device is a portable computing device, and wherein the plurality of available operating systems comprises a first operating system operable on the first processor architecture and a second operating system operable on the second processor architecture, the method further comprising:
    selecting the first processor having the first processor architecture and loading the first operating system on the first processor responsive to determining that the host computing device has a first device type; and
    selecting the second processor having the second processor architecture and loading the second operating system on the second processor responsive to determining that the host computing device has a second device type.

4. The method of claim 1, wherein the computing device comprises a processor having a first processor architecture and the selected operating system is operable on a second processor architecture, the method further comprising:
    starting a virtual machine that runs on the first processor and emulates the second processor architecture; and
    loading the selected operating system on the virtual machine.

5. The method of claim 1, further comprising:
    detecting that the computing device has been disconnected from the host computing device; and
    responsive to detecting the disconnection, shutting down or suspending the computing device, wherein suspending the computing device comprises selecting one or more of a plurality of processes to maintain in memory and terminating a remainder of the plurality of processes.

6. The method of claim 5, wherein the host computing device is a first one of a mobile phone, a tablet computer, a notebook computer or a desktop computer that lacks an operating system, the method further comprising:
    detecting a new connection to an additional host computing device;
    receiving new data from the additional host computing device identifying at least one of the device type of the additional host computing device or properties of the additional host computing device;
    selecting a second operating system from the plurality of available operating systems in view of the received new data; and
    loading the second operating system.

7. The method of claim 1, wherein the computing device comprises user data that is accessible to each of the plurality of operating systems.

8. A computer readable storage medium comprising instructions to cause a host computing device to:
    detect, by the host computing device, a connection to a first computing device, wherein the first computing device comprises an operating system that will control operation of the host computing device;
    receive data from the first computing device;
    store the data in at least one of a memory or a storage device of the host computing device; and
    responsive to detecting that the first computing device has been disconnected from the host computing device, remove the stored data.

9. The computer readable storage medium of claim 8, the host computing device further to:
    responsive to detecting the connection to the first computing device, send to the first computing device data to identify at least one of a device type of the host computing device or properties of the host computing device, wherein the first computing device selects an operating system based on the data.

10. The computer readable storage medium of claim 8, the host computing device further to:
    receive at least one of an alphanumeric input or a cursor input from a user; and
    send at least one of an alphanumeric command or a cursor command to the first computing device in view of the received alphanumeric input or cursor input.

11. The computer readable storage medium of claim 8, wherein the first computing device is a portable computing device and comprises a first processor and the host computing device comprises a second processor that supplements the first processor, the host computing device further to:
    shut off the second processor responsive to detecting that the first computing device is disconnected.

12. The computer readable storage medium of claim 8, the host computing device further to:
    detect a new connection to a second computing device, wherein the second computing device comprises an additional operating system that will control operation of the host computing device;
    receive new data from the second computing device; and
    store the new data in at least one of the memory or the storage device of the host computing device, wherein no data from the first computing device remains in the memory or storage device.

13. A system comprising:
    a computing device comprising a port to connect to a host computing device, a memory, a storage device, and at least one processor coupled to the port, memory and storage device via a bus, the computing device to:
        detect a connection to the host computing device via the port;
        receive data from the host computing device identifying at least one of a device type of the host computing device or properties of the host computing device;

select an operating system from a plurality of available operating systems installed on the computing device in view of the received data; and load the selected operating system on the computing device to boot up the selected operating system.

14. The system of claim 13, wherein the computing device is further to:

receive user inputs from the host computing device in view of cursor events or keyboard events on the host computing device;

perform operations in view of the user inputs; and send output data to the host computing device.

15. The system of claim 13, wherein the at least one processor comprises a first processor having a first processor architecture and a second processor having a second processor architecture, wherein the computing device is a portable computing device, and wherein the plurality of available operating systems comprises a first operating system operable on the first processor architecture and a second operating system operable on the second processor architecture, the computing device to:

select the first processor having the first processor architecture and load the first operating system on the first processor responsive to determining that the host computing device has a first device type; and select the second processor having the second processor architecture and load the second operating system on the second processor responsive to determining that the host computing device has a first device type.

16. The system of claim 13, wherein the at least one processor has a first processor architecture and the selected operating system is operable on a second processor architecture, the computing device to:

start a virtual machine that runs on the at least one processor and emulates the second processor architecture; and load the selected operating system on the virtual machine.

17. The system of claim 13, wherein the computing device is further to:

detect that the computing device has been disconnected from the host computing device; and responsive to the detecting the disconnection, shut down or suspend the computing device, wherein suspending the computing device comprises selecting one or more of a plurality of processes to maintain in the memory and terminating a remainder of the plurality of processes.

18. The system of claim 17, wherein the at least one processor is further to:

detect a new connection to an additional host computing device;

receive new data from the additional host computing device identifying at least one of the device type of the additional host computing device or properties of the additional host computing device;

select a second operating system from the plurality of available operating systems in view of the received new data; and load the second operating system.

19. The system of claim 17, wherein the storage device contains user data that is accessible to each of the plurality of operating systems.

20. The system of claim 13, further comprising:

the host computing device comprising an alphanumeric input device, a display and at least one of an additional memory or an additional storage device, the host computing device to:

detect the connection to the computing device;

receive data from the computing device;

store the data in at least one of the additional memory or the additional storage device; and responsive to detecting that the computing device has been disconnected from the host computing device, remove the data.

* * * * *